United States Patent
Yi et al.

(10) Patent No.: US 10,200,139 B2
(45) Date of Patent: Feb. 5, 2019

(54) METHOD AND APPARATUS FOR PERFORMING INTERFERENCE COORDINATION IN WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR); Daesung Hwang, Seoul (KR); Hanbyul Seo, Seoul (KR); Kijun Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 50 days.

(21) Appl. No.: 14/771,466

(22) PCT Filed: Mar. 24, 2014

(86) PCT No.: PCT/KR2014/002448
§ 371 (c)(1),
(2) Date: Aug. 28, 2015

(87) PCT Pub. No.: WO2014/148875
PCT Pub. Date: Sep. 25, 2014

(65) Prior Publication Data
US 2016/0006529 A1 Jan. 7, 2016

Related U.S. Application Data

(60) Provisional application No. 61/804,191, filed on Mar. 22, 2013, provisional application No. 61/807,735, (Continued)

(51) Int. Cl.
*H04W 4/00* (2018.01)
*H04J 11/00* (2006.01)
(Continued)

(52) U.S. Cl.
CPC .......... *H04J 11/005* (2013.01); *H04B 7/0417* (2013.01); *H04J 11/0056* (2013.01);
(Continued)

(58) Field of Classification Search
CPC ....................................................... H04L 5/001
See application file for complete search history.

(56) References Cited

U.S. PATENT DOCUMENTS 8,301,182 B2 * 10/2012 Kim ...................... H04L 5/0035
370/328
8,442,545 B2 * 5/2013 Guey .................... H04L 5/0041
370/317
(Continued)

FOREIGN PATENT DOCUMENTS

CA          2826790 A1   8/2012
CN       102355322 A    2/2012
(Continued)

*Primary Examiner* — Guang W Li
(74) *Attorney, Agent, or Firm* — Birch, Stewart, Kolasch & Birch, LLP

(57) ABSTRACT

A method for and apparatus for performing interference coordination in a wireless communication system is provided. A wireless device may transmit measurement results on neighboring cells; receive information of grouping of the neighboring cells based on the measurement results; and receive a signal to be applied with a different sub-band, a subframe shift, or a Orthogonal frequency division multiplexing (OFDM) symbol shift according to the information of grouping from each cell of the neighboring cells.

14 Claims, 12 Drawing Sheets

Related U.S. Application Data filed on Apr. 2, 2013, provisional application No. 61/809,411, filed on Apr. 7, 2013, provisional application No. 61/815,242, filed on Apr. 23, 2013.

(51) Int. Cl.
*H04L 5/00* (2006.01)
*H04B 7/0417* (2017.01)
*H04W 24/02* (2009.01)

(52) U.S. Cl.
CPC ............ *H04L 5/001* (2013.01); *H04L 5/0044* (2013.01); *H04W 24/02* (2013.01)

(56) References Cited

U.S. PATENT DOCUMENTS

| | | | | |
|---|---|---|---|---|
| 8,542,654 B1* | 9/2013 | Dinan | ............... | H04W 56/0005 370/331 |
| 8,559,992 B2* | 10/2013 | Larsson | ............... | H04W 72/082 455/452.2 |
| 8,660,092 B2* | 2/2014 | Jeon | ................. | H04W 36/0083 370/332 |
| 8,725,167 B2* | 5/2014 | Siomina | ................ | G01S 5/0036 455/456.1 |
| 8,818,443 B2* | 8/2014 | Yamamoto | .......... | H04W 52/242 370/318 |
| 8,861,444 B2* | 10/2014 | Shang | ................... | H04W 48/16 370/328 |
| 8,873,413 B2* | 10/2014 | Jang | ..................... | H04W 24/10 370/252 |
| 8,891,402 B2* | 11/2014 | Yin | ...................... | H04L 1/0026 370/254 |
| 9,008,678 B2* | 4/2015 | Schoenerstedt | ....... | H04W 24/00 455/452.1 |
| 9,107,084 B2* | 8/2015 | Siomina | ................ | H04W 24/00 |
| 9,407,520 B2* | 8/2016 | Stalnacke | ........... | H04W 24/10 |
| 9,426,706 B2* | 8/2016 | Ishii | ...................... | H04W 24/10 |
| 9,538,401 B1* | 1/2017 | Ouyang | ................ | H04W 24/02 |
| 2004/0117226 A1* | 6/2004 | Laiho | ................ | G06Q 10/06393 705/7.39 |
| 2004/0185859 A1* | 9/2004 | Barkan | ................. | H04W 24/02 455/449 |
| 2008/0090575 A1* | 4/2008 | Barak | ................... | H04W 16/10 455/444 |
| 2009/0312027 A1* | 12/2009 | Foschini | .............. | H04W 24/02 455/446 |
| 2010/0034151 A1* | 2/2010 | Alexiou | ................. | H04B 7/022 370/329 |
| 2010/0118706 A1* | 5/2010 | Parkvall | ............... | H04L 5/0023 370/241 |
| 2010/0190488 A1* | 7/2010 | Jung | ..................... | H04W 24/10 455/424 |
| 2010/0291940 A1* | 11/2010 | Koo | ....................... | H04B 7/024 455/450 |
| 2011/0044272 A1* | 2/2011 | Cui | ...................... | H04B 7/0452 370/329 |
| 2011/0045831 A1* | 2/2011 | Chiu | ................... | H04W 72/082 455/436 |
| 2011/0081942 A1 | 4/2011 | Wengerter et al. | | |
| 2011/0092232 A1* | 4/2011 | Lee | ....................... | H04B 7/0639 455/501 |
| 2011/0183669 A1* | 7/2011 | Kazmi | ................. | H04J 11/0086 455/434 |
| 2011/0280205 A1 | 11/2011 | Qin et al. | | |
| 2011/0292846 A1* | 12/2011 | Hu | ......................... | H04W 72/00 370/280 |
| 2012/0135766 A1* | 5/2012 | Garavaglia | ............ | H04B 7/024 455/509 |
| 2012/0182879 A1* | 7/2012 | Tamura | .................... | H04L 5/001 370/242 |
| 2013/0114496 A1* | 5/2013 | Mazzarese | ............ | H04L 5/0023 370/312 |
| 2013/0229954 A1* | 9/2013 | Narathong | ............. | H04B 1/408 370/280 |
| 2013/0235738 A1* | 9/2013 | Siomina | ................ | H04W 24/00 370/252 |
| 2013/0244682 A1* | 9/2013 | Schoenerstedt | ....... | H04W 24/00 455/452.1 |
| 2013/0272170 A1* | 10/2013 | Chatterjee | ............. | H04W 28/02 370/280 |
| 2013/0303152 A1* | 11/2013 | Kim | .................... | H04W 72/082 455/422.1 |
| 2013/0316709 A1* | 11/2013 | Watanabe | ............. | H04W 24/02 455/435.2 |
| 2014/0011531 A1* | 1/2014 | Burstrom | ............ | H04W 72/121 455/509 |
| 2014/0146696 A1* | 5/2014 | Lin | ....................... | H04W 72/12 370/252 |
| 2014/0200016 A1* | 7/2014 | Siomina | ................ | H04W 24/08 455/450 |
| 2014/0204783 A1* | 7/2014 | Lin | ....................... | H04W 24/02 370/252 |
| 2014/0220990 A1* | 8/2014 | Lorca Hernando | .... | H04J 11/005 455/450 |
| 2014/0301255 A1* | 10/2014 | Yin | .......................... | H04L 5/14 370/280 |
| 2014/0301268 A1* | 10/2014 | Xu | ........................ | H04W 24/02 370/312 |
| 2014/0376464 A1* | 12/2014 | Nam | ...................... | H04B 7/0639 370/329 |
| 2015/0131553 A1* | 5/2015 | Centonza | ............ | H04W 24/10 370/329 |

FOREIGN PATENT DOCUMENTS

| | | |
|---|---|---|
| EP | 1603356 A2 | 12/2005 |
| KR | 10-2012-0077432 A | 7/2012 |
| WO | WO 2012/069352 A1 | 5/2012 |

* cited by examiner

[Fig. 1]
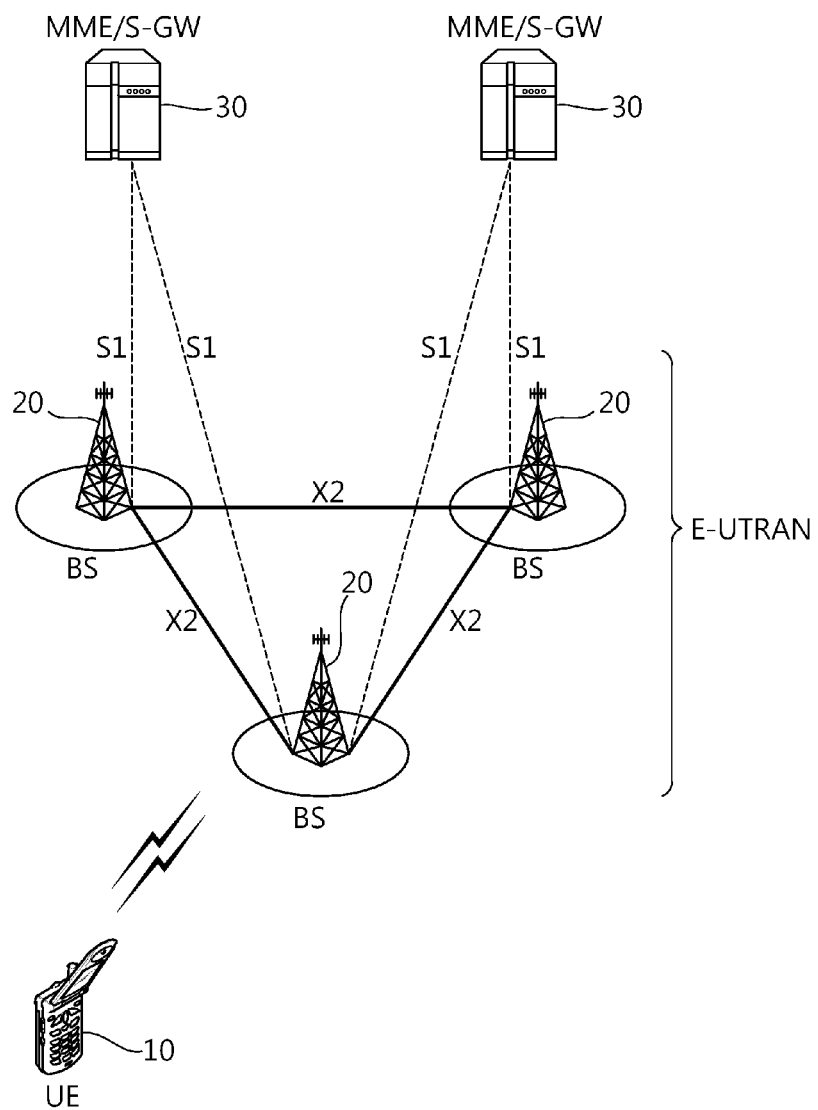

[Fig. 2]
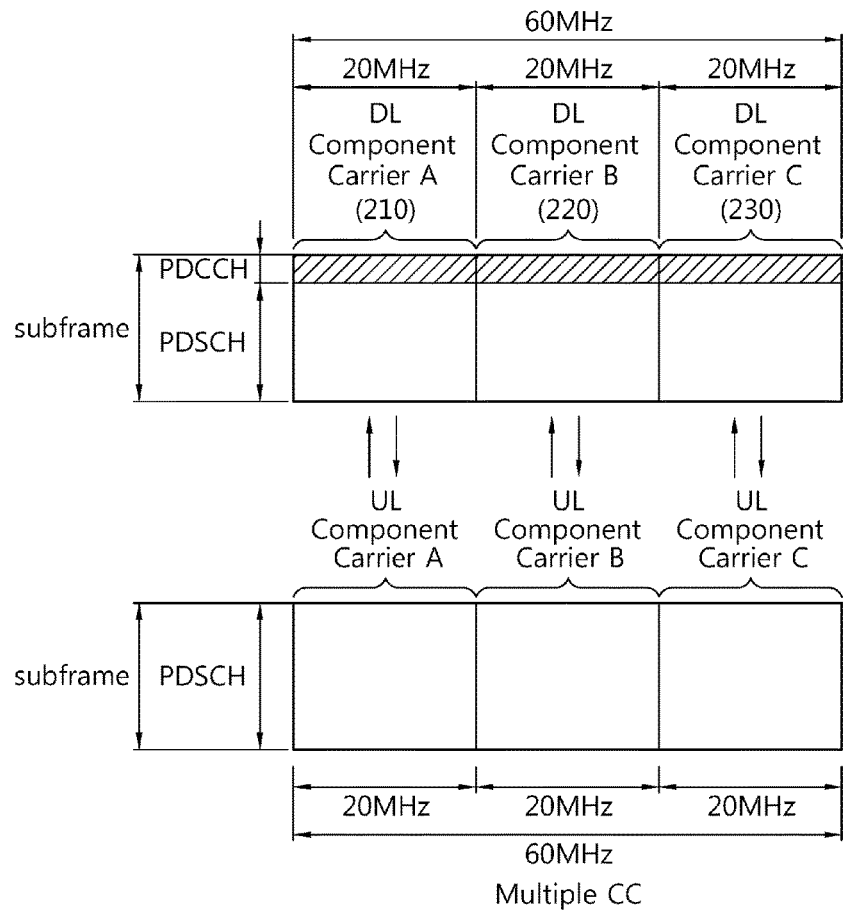
[Fig. 3]
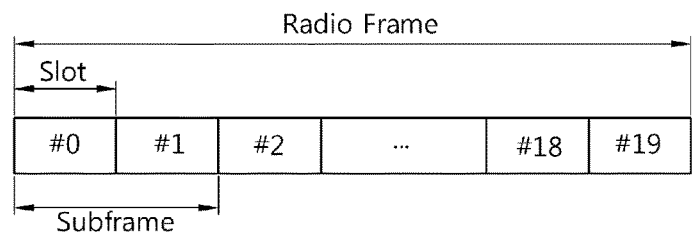

[Fig. 4]
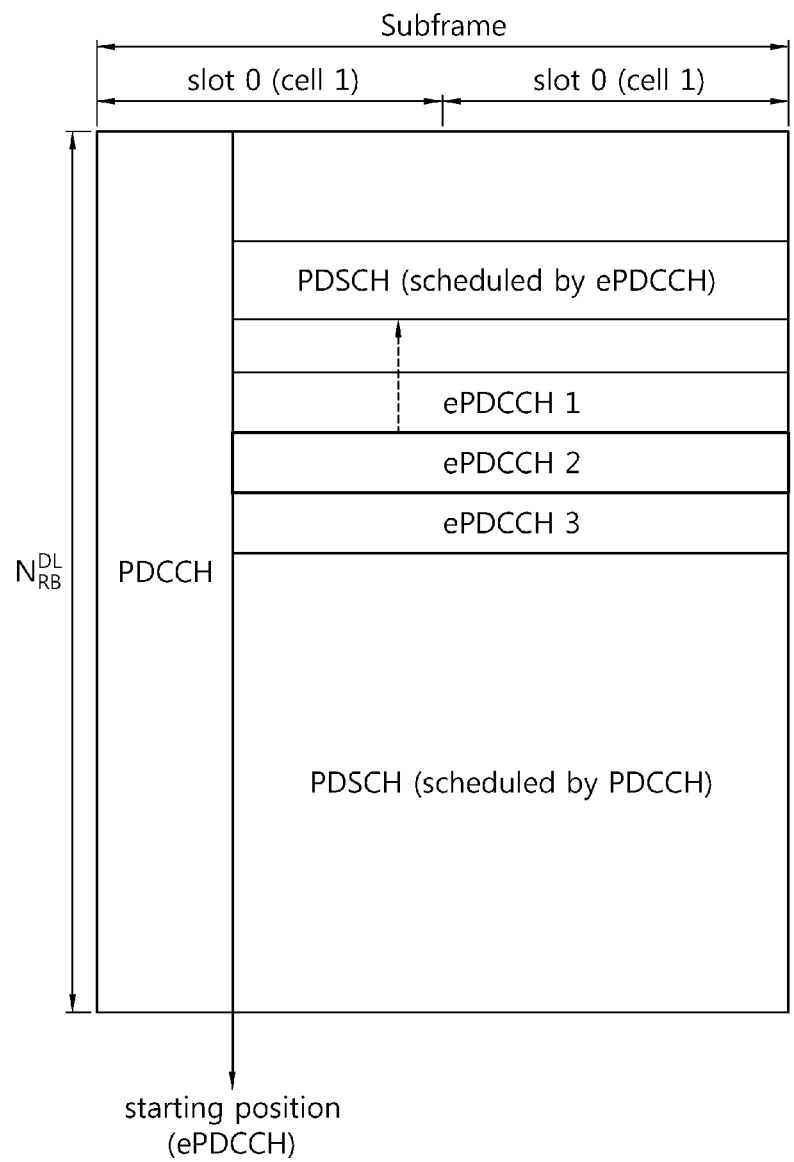

[Fig. 5]
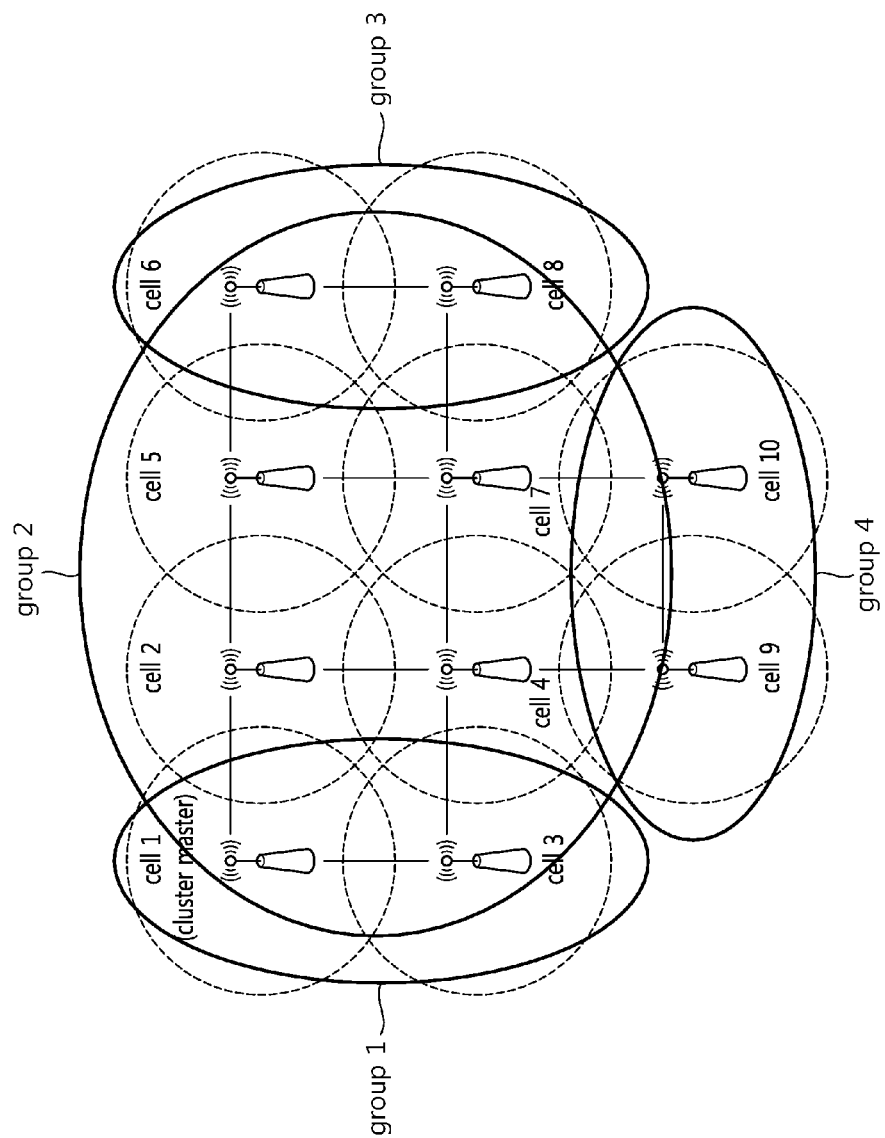

[Fig. 6]
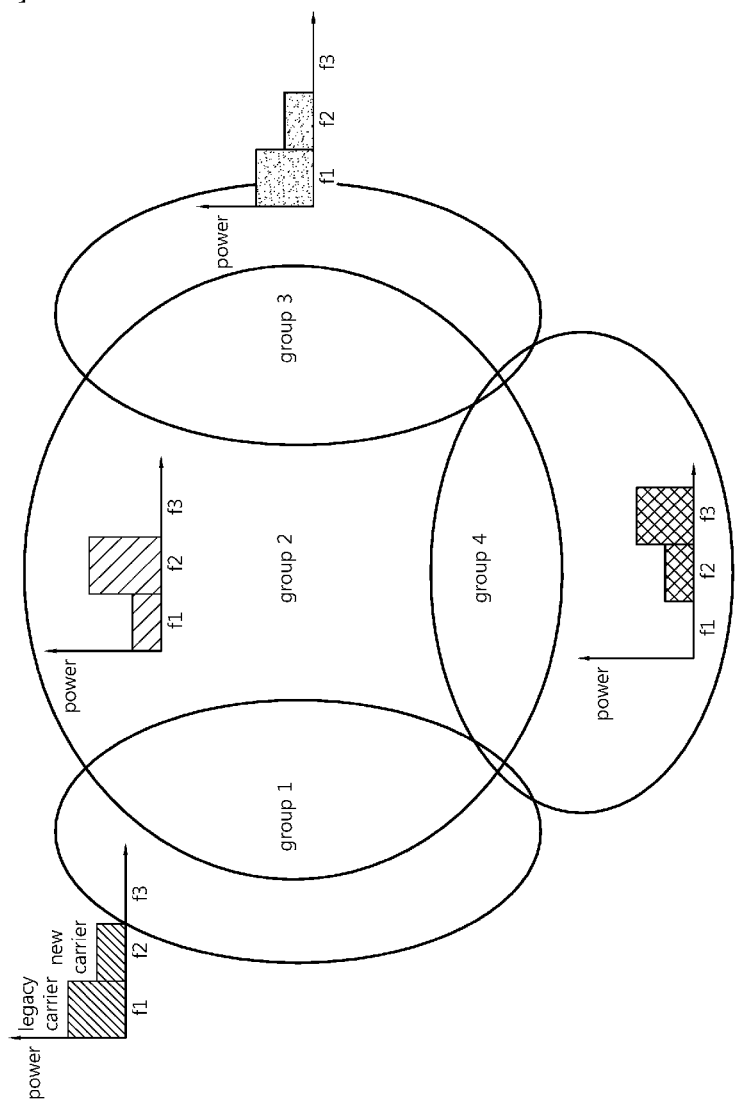

[Fig. 7]
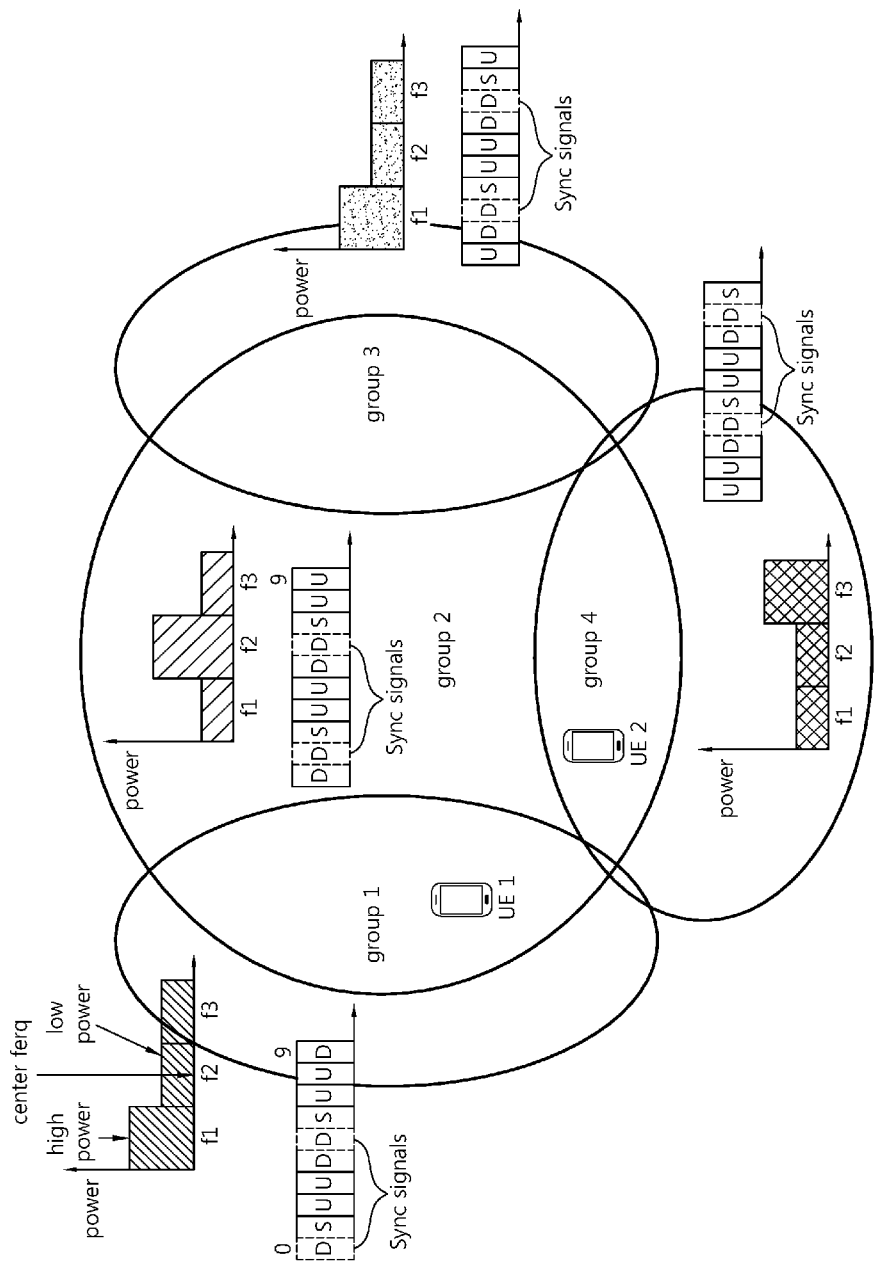

[Fig. 8]
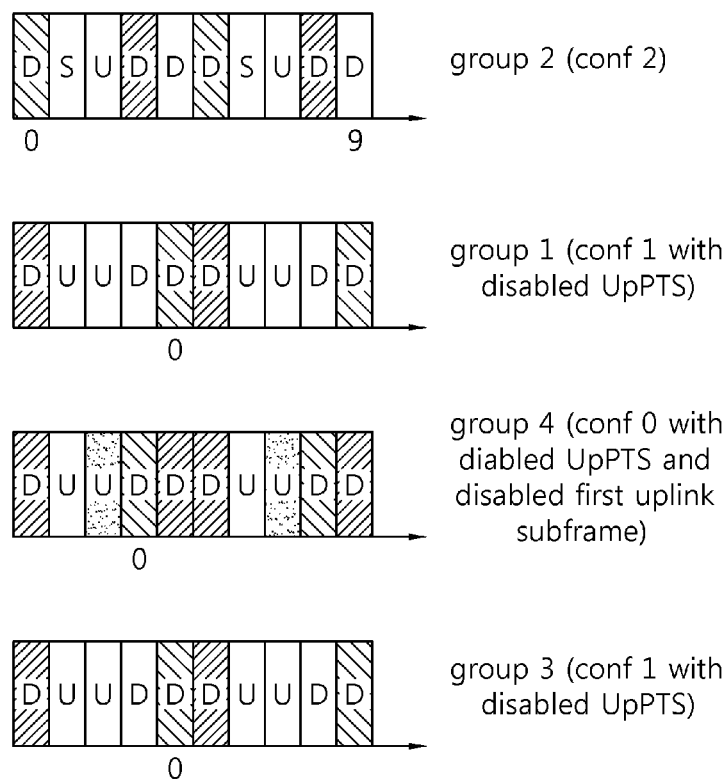

[Fig. 9]
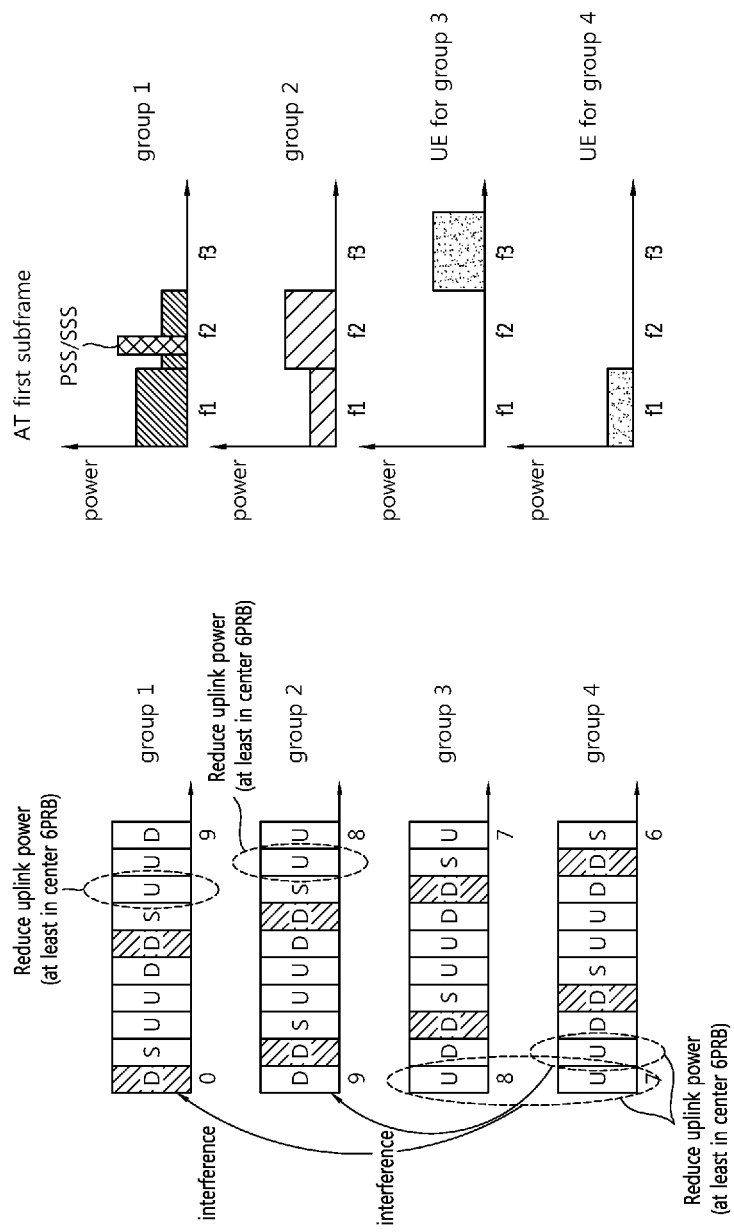

[Fig. 10]
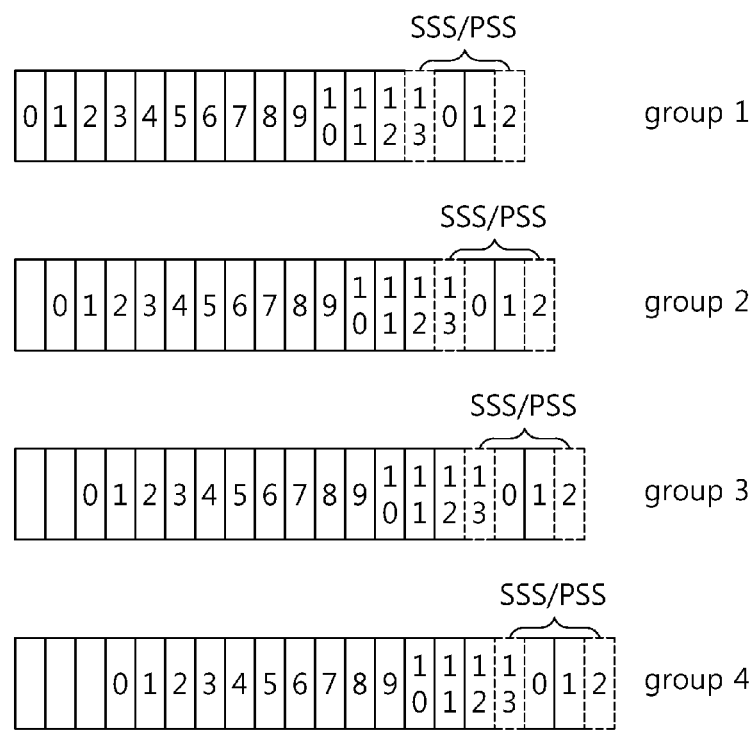

[Fig. 11]
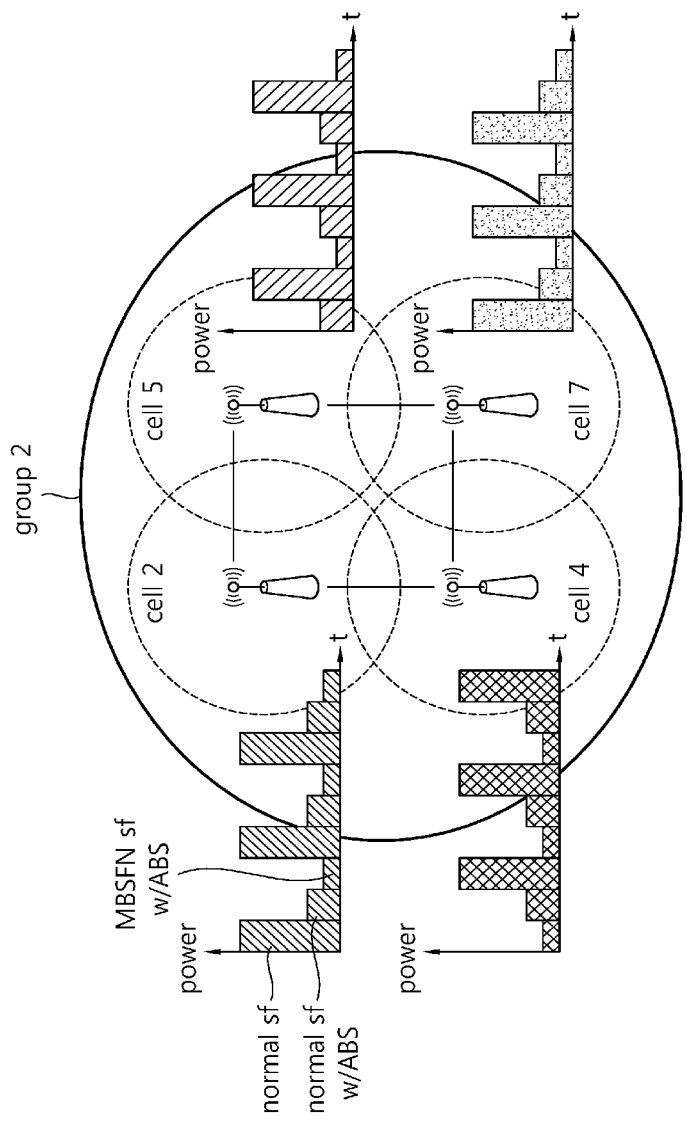

[Fig. 12]
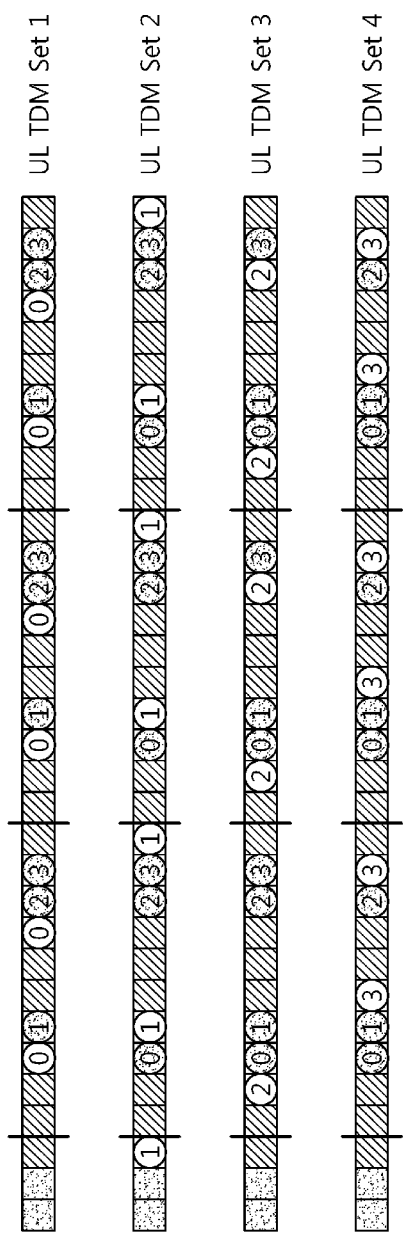

[Fig. 13]
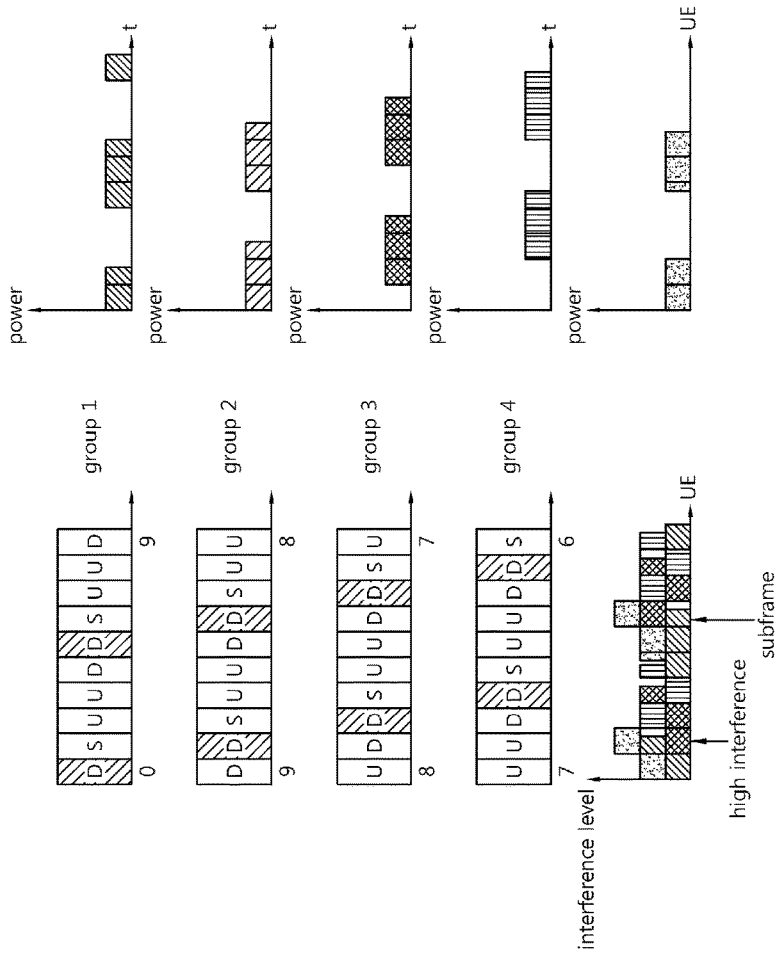
[Fig. 14]
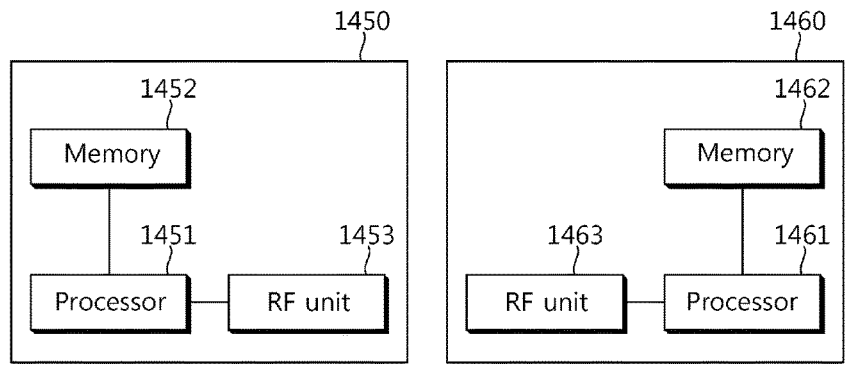

METHOD AND APPARATUS FOR PERFORMING INTERFERENCE COORDINATION IN WIRELESS COMMUNICATION SYSTEM

CROSS REFERENCE TO RELATED APPLICATIONS

This application is the National Phase of PCT/KR2014/002448 filed on Mar. 24, 2014, which claims priority under 35 U.S.C. 119(e) to U.S. Provisional Application No. 61/804,191 filed on Mar. 22, 2013, U.S. Provisional Application No. 61/807,735 filed on Apr. 2, 2013, U.S. Provisional Application No. 61/809,411 filed on Apr. 7, 2013, and U.S. Provisional Application No. 61/815,242 filed on Apr. 23, 2013, all of which are hereby expressly incorporated by reference into the present application.

TECHNICAL FIELD

The present invention relates to wireless communications, and more particularly, to a method and apparatus for performing interference coordination among inter-cells in a wireless communication system consisting of multiple carriers over single frequency or multiple frequencies.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a CA environment. The multi-component carrier system performs both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an eNB (enhanced Node B) and a User equipment as a Terminal. Also an efficient cell planning for multi-CCs is required. Also various signals or efficient cell planning schemes are required to transmit between the eNB and the UE to support inter-cell interference reduction and carrier extensions. Furthermore, inter-node resource allocation by tight coordination among eNBs for a UE is also feasible where multi-CC aggregation is achieved over multiple eNBs/nodes. An efficient operation scheme for the cell planning including a new carrier which is necessarily transmitted restricted or eliminated controls and RS signals, and further UE's operation in a small cell cluster environment need to be defined. The efficient operation includes inter-cell interference coordination in small cell environment.

DISCLOSURE OF INVENTION

Technical Problem

The present invention provides a method and apparatus for performing interference coordination among inter-cells in a wireless communication system.

The present invention also provides a method and apparatus for performing a cell configuration with different resource time and frequency among multiple cells in a wireless communication system.

The present invention also provides a method and apparatus for receiving signals in grouped different time and frequency resources among multiple cells in a wireless communication system.

Solution to Problem

In an aspect, a method for performing interference coordination among inter-cells in a wireless communication system is provided. The method may include transmitting measurement results on neighboring cells; receiving information of grouping of the neighboring cells based on the measurement results; and receiving a signal to be applied with a different sub-band, a subframe shift, or a Orthogonal frequency division multiplexing (OFDM) symbol shift according to the information of grouping from each cell of the neighboring cells.

In another aspect, a wireless device for performing interference coordination in a wireless communication system is provided. The wireless device includes a radio frequency (RF) unit for transmitting and receiving a radio signal; and a processor operatively coupled to the RF unit, wherein the processor is configured for: transmitting measurement results on neighboring cells; receiving information of grouping of the neighboring cells based on the measurement results; and receiving a signal to be applied with a different sub-band, a subframe shift, or a Orthogonal frequency division multiplexing (OFDM) symbol shift according to the information of grouping from each cell of the neighboring cells.

Advantageous Effects of Invention

The proposed embodiment supports data and control transmission efficiency with minimized interference condition and dynamic coverage by small cells. Especially, the proposed embodiment supports to configure transmission for synchronization and discovery based on sets of grouping of small cells, between small cells or the small cells and a macro cell can be connected via air interface for the transmission efficiency without latency.

BRIEF DESCRIPTION OF DRAWINGS

FIG. 1 shows a wireless communication system to which the present invention is applied.

FIG. 2 shows an exemplary concept for a carrier aggregation (CA) technology according to an exemplary embodiment of the present invention.

FIG. 3 shows a structure of a radio frame to which the present invention is applied.

FIG. 4 shows downlink control channels to which the present invention is applied.

FIG. 5 shows a concept of small cell grouping within a small cell cluster which the present invention is applied FIG. 6 shows an example of FDM among groups which the present invention is applied.

FIG. 7 shows an example of subframe shift among groups in TDD system which the present invention is applied.

FIG. 8 shows an example of candidate TDD configuration and subframe shift k which the present invention is applied.

FIG. 9 shows an example of UL/DL interference handling by FDM with TDD subframe shift which the present invention is applied.

FIG. 10 shows an example of OFDM symbol shift in TDD system which the present invention is applied.

FIG. 11 shows an example of TDM within a group which the present invention is applied.

FIG. 12 shows an example of TDD configuration 1 TDM example which the present invention is applied.

FIG. 13 shows an example of different interference level per subframe which the present invention is applied.

FIG. 14 shows a block diagram showing a wireless communication system according to an exemplary embodiment of the present invention.

MODE FOR THE INVENTION

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, a cell, node-B, or node etc.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

More details, radio protocol architecture for a user plane (U-plane) and a control plane (C-plane) explains. A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface. Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and re-assembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (it may also be referred to as an RRC connected mode), and otherwise the UE is in an RRC idle state (it may also be referred to as an RRC idle mode).

FIG. 2 shows an exemplary concept for a carrier aggregation (CA) technology according to an exemplary embodiment of the present invention.

Referring to FIG. 2, the DL/UL subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

A Carrier or a cell may be divided into a primary component carrier (PCC) and a secondary component carrier (SCC) depending on whether or not they are activated. A PCC is always activated, and an SCC is activated or deactivated according to particular conditions. That is, a Pcell (primary serving cell) is a resource in which the UE initially establishes a connection (or a RRC connection) among several serving cells. The Pcell serves as a connection (or RRC connection) for signaling with respect to a plurality of cells (CCs), and is a special CC for managing UE context which is connection information related to the UE. Further, when the Pcell (PCC) establishes the connection with the UE and thus is in an RRC connected mode, the PCC always exists in an activation state. A SCell (secondary serving cell) is a resource assigned to the UE other than the Pcell (PCC). The SCell is an extended carrier for additional resource assignment, etc., in addition to the PCC, and can be divided into an activation state and a deactivation state. The SCell is initially in the deactivation state. If the SCell is deactivated, it includes not transmit SRS on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

To enhance the user throughput, it is also considered to allow inter-node resource aggregation over more than one eNB/node where a UE may be configured with more than one carrier groups. It is configured PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 which is a master PCell cannot be used for activation/deactivation.

More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as S-PCell hereinafter. Herein, the index of the serving cell may be a logical index determined relatively for each UE, or may be a physical index for indicating a cell of a specific frequency band. The CA system supports a non-cross carrier scheduling of self-carrier scheduling, or cross carrier scheduling.

FIG. 3 shows a structure of a radio frame to which the present invention is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference. Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

The downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are rep-resented by the number of resource blocks, they are 6, 15, 25, 50, 75, and 100, respectively.

The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated. Examples of downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARM). That is, ACK/NACK signals for uplink data that has been transmitted by a UE are transmitted on a PHICH.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs. The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (e.g., P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

Thus, the BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI.

Meanwhile, an uplink subframe may be divided into a control region to which a physical uplink control channel (PUCCH) that carries uplink control information is allocated; the control information includes an ACK/NACK response of downlink transmission. A data region to which physical uplink shared channel (PUCCH) that carries user data is allocated in the frequency domain. The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a CQI, and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system.

Herein, an ePDCCH can be one of solutions of limitation for a PDCCH transmission or new control information transmission of near future commination system including a new type of carrier as shown in FIG. 4. The ePDCCH which can be multiplexed with the PDSCH can support multiple Scells of the CA.

Referring to FIG. 4, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in MBSFN subframes in NC and how many ODFM symbols will be allocated if used can be configured via RRC signaling. Further TM10 and new TM mode of UE can be considered for new carrier type as well. Hereafter, new carrier type refers to a carrier where all or part of legacy signals can be omitted or transmitted in different manners. For example, a new carrier may refer a carrier where CRS may be omitted in some subframes or PBCH may not be transmitted.

For this next LTE system or enhanced communication system, this proposed embodiment provides that the new carrier cell may be introduced in which all or some of the proposed backward compatible legacy signals and/or channels are not transmitted for reasons of the improvement of an interference problem between a plurality of cells, the enhancement of carrier extensibility, and an increase in the degree of freedom in providing advanced features. Even though the proposed invention is mainly described for legacy carriers as an example, it does not limit to the legacy carriers cell only, it can be also applied to new carriers without the loss of generality as well.

More details, this invention considers cases where cell-specific RS used for tracking and the Radio Resource Management (RRM) measurement would not be transmitted at all or transmitted only a subset of subframes different from legacy carrier. For a convenience, this invention shows an example where CRS or tracking RS is transmitted every 5 msec e.g., subframe #0 and #5 in each radio frame. More particularly, a new carrier may refer a carrier which performs cell on/off where eNB turns off trans-missions upon no active UE attached or based on a pattern. If this is assumed, this invention shows an example where PSS/SSS/CRS or a discovery signal based on CSI-RS is transmitted every T msec with a predetermined value e.g., T=200, or more than 200.

This proposed embodiment also supports an efficient transmission within a small cell cluster. More specifically, a dual connectivity for data flow and macro/small cell carrier-aggregation (CA), inter-site CA, or UE is connected to a small cell which belongs to a small cell cluster assuming a dense small cell deployment is supported.

This proposed embodiment also discusses techniques to handle ICIC (Inter-cell interference coordination) in small cell scenarios and propose a new cell selection criteria. The scenarios considered in this invention mostly assume that macro and small cell layer use different frequency such as 2.6 Ghz and 3.5 Ghz respectively and small cell layer has wide band carriers such as 5×20 Mhz consecutive carriers. This invention thus mainly focuses on the interference coordination among small cells rather than between macro and small cell layer. However, it is noted that the techniques here can be applied to co-channel case where macro and small cell layers coexist or among macro cells when applicable.

The following tools are supported to coordinate/control interference among cells, a Relative Narrowband Transmit Power (RNTP) message includes information of bitmaps of RBs to indicate whether this eNB is planning to use power with upper bound limit. OI (overload indicator) is user for each RB to indicate low, med, or high. High Interference Indicator (HII) messages are exchanged between two eNBs with bitmap of RBs to indicate which RBs will be used with high power. ABS (almost blank subframe) is introduced in time domain eICIC to coordinate inter cell interference in the time domain. The ABS only contains some necessary signals with low power, such as PSS/SSS, PBCH, CRS, Paging, and SIB1, and these ABSs are used by the interfered cell to provide service for its subscribers who previously experienced strong interference. A restricted RRM/RLM measurement in consideration of ABS is allowed.

In small cell scenarios, the following characteristics are unique or different from previously deployed HetNet scenarios which may require additional ICIC tools. The additional ICIC schemes considers to resolve problems that non-ideal backhaul is a situation that backhaul latency becomes larger than 50 msec and a smaller than 50 msec update period is not allowed so that dynamic ICIC is not easily feasible. Also, interference characteristic can be changed due to cell on/off, the new signaling may be effective for a cell state change or dynamic user traffic. When super dense small cells are existed in specific condition, coordination among small cells may not be easy due to the large number of neighboring small cells. Lastly, if small cells are deployed in a clustered fashion, a group of small cells are connected together to the core network at least for operator deployed small cells. The scenario considered in this proposed embodiment is the case where macro layer and small cell layer use different frequencies and small cell may have multiple carriers.

Firstly, this invention is described that interference on cell-specific RS can be handled by using the RNTP and the ABS, a combined TDM and FDM scheme can be coordinated among small cells. For example, when a small cell has 100RB with RNTP pattern RNTP_A with ABS pattern ABS_A, as UE is not aware of ABS or RNTP configuration, it expects to receive constant power of CRS in all subframes and in all RBs. When the number of neighboring cells are more than 6 which can be differentiated by V shift, there will be colliding CRS REs. To suppress or cancel the interference from neighboring CRS, CRS ports and MBSFN configuration of the neighbor cell may be forwarded to the UE. To support this, a few alternatives can be considered. For cell discovery among small cells, as the number of small cells is large, the set of neighboring cells for each UE may need to be discovered. One approach is to discover neighbor cells by cell discovery among cells and then the serving cell may use the information from UE e.g., RSRP or SRS-based UE measurement to form a neighbor set for each UE. The list of cell IDs with necessary information such as CRS port, MBSFN configuration may be transmitted to the UE. In case that each UE identifies neighbor cells via cell discovery, to help this process, additional discovery signal may be transmitted. The discovery signal may carry necessary information.

For interference on synchronization signals, when a small cell cluster where network synchronization is assumed, each cell may take different sub-band to transmit synchronization signals, and between small cell clusters, OFDM symbols or subframes may be shifted to avoid collision on sync and other signals. Also similar to CRS, additional information of neighbor cells may be given to a UE so that it can suppress or cancel the interference.

FIG. 5 shows a concept of small cell grouping within a small cell cluster which the present invention is applied Referring to FIG. 5, in a small cell cluster where the number of small cells may be considerable e.g., 10 small cells, effective FDM would not be so straightforward due to the large number of small cells. This may degrade the network throughput as each cell may choose very narrow subband to avoid interference with many cells.

A concept of grouping is described, it is desirable to group cells with high interference each other to the group in terms of downlink and uplink transmission. Thus, each cell needs information to decide which cells or group that the cell should belong to. Cells belonging to the same group are expected to perform tightly coordinated ICIC such as CoMP, coordinated beam-forming, inter-cell nulling, etc. Therefore, the grouping may be performed based on a list of UE's that each cell can serve. Even though UE is not connected to the cell, this list includes potential UEs which have sufficient channel quality which can be served by itself. This can be estimated based on uplink signal such as SRS or reported UE RRM measurement reports. If this is used, if the number of UEs common in the group master and the cell is more than K users or K % (common users/total number of users), the cell may join the group.

Also the grouping may be performed based on backhaul quality, if ideal backhaul is defined between two cells, the two cells can form a group. Cell discovery signal strength can be one of conditions for grouping. If cell discovery signal is used among cells, signal quality can be used to determine the groups. In a multi-carrier scenario, cells chosen the same frequency carrier, e.g., f1 in f1 and f2 multi-carrier system can form the same group so that operating carrier is the one of reason for grouping. Further, cell discovery via direct air interface can be a set, if two cells can discover each other via air interface directly without going through another cell or UE, two cells can form a group. A group is set based on the cell ID, if cell IDs of two cells in module 3 are same i.e., same PSS sequence and cells are neighboring cells, two cells may belong to the same group. Also, the group is determined based on cell coverage, in case other cells go into dormant mode, whether the other cell can cover the dormant mode cells. If this is used for grouping, cell on/off within a group can be used for controlling interference.

For example, one cell at each group may be in active mode when the number of UEs is small or the traffic rate is low and may increase the number of active cells with UE numbers or traffic rate dynamically. Cell switch within a group may be done via L1/L2 switch command rather than hand-over. Lastly, the group is set based on a TDD configuration.

To support grouping forming rules mentioned in above, the list of parameters which can be exchanged via X2 interface would be to obtain the information on the overlapped or potentially interfering UEs between two cells, multiple approaches can be considered. First is to use UE RRM measurement. When a UE reports the RRM measurement on neighboring cells, the report can be shared among neighboring cells. Each cell based on the UE measurement can determine the list of UEs which can be served by itself (i.e., the signal quality is better than a threshold). If a cell obtains the information from neighbor cells of serving UEs' RRM measurement, it can calculate the number of UEs overlapped between cells and can use the metric to determine the groups. Another approach is to perform measurement at eNB based on UE uplink signaling such as PRACH and/or SRS. Based on the UE measurement (even for UEs not served by itself), the list of UEs with better quality than a threshold can be exchanged among neighbor cells to determine the grouping.

Backhaul quality may be determined based on latency on data communication between two cells. Average latency may be used to determine the backhaul quality. It can be computed at each cell or the computed latency may be Backhaul quality may be determined based on latency on data communication exchanged among neighbor cells. The list can be obtained at each cell and may not require additional X2 signaling. If necessary, those information may be exchanged among cells. As recommend, X2 signaling may not be needed. Cell ID may be exchanged via X2 interface or discover via cell discovery among cells. Thus, additional X2 signaling may not be needed. It can be defined as a cell C1 can cover another cell C2 if serving UEs of C2 reports the signal quality to C1 higher than a threshold (i.e., if needed serving UEs can be attached to C1 with cell range expansion). Based on RRM measurement report exchange for serving UEs on neighbor cells among neighbor cells, each cell may compute the coverage relationship between cells or among cells. To determine TDD configuration, each cell may estimate the ratio of uplink and downlink subframe based on expected user traffic or applications. The desired TDD configurations can be exchanged among neighbor cells via backhaul.

This embodiment notes that it is desirable to keep the number of groups within a cluster to a certain number (e.g., 3) as it may perform frequency division multiplexing to minimize the interference. Cluster master may broadcast a number which is the maximum number of cells belonging to one group or the maximum number of groups so that a cell uses this information along with above information to decide whether to join a group or form a new group.

FIG. 6 shows an example of FDM among groups which the present invention is applied.

Referring to FIG. 6, when the maximum carrier bandwidth is 20 Mhz, interference coordination among cells can be done in two different ways to achieve FDM. First is to limit the power per each RB (i.e., FFR) and the other is to divide the carrier into a few sub-band carriers. An ICIC via FFR still leaves the limitation in particularly with synchronized TDD system for small cell scenarios. Longer cell acquisition time may be happened since PSS/SSS from multiple cells are transmitted at the same time, relatively high interference level on PSS/SSS is expected. Particularly if cells are deployed densely i.e., minimum distance between cells is small, signal strength from multiple cells may be comparable to many users which will degrade SNIR of synchronization signals. Lower channel estimation and tracking performance may come you, similar to PSS/SSS, the quality of CRS is impaired. Thus, overall channel estimation and tracking performance would be degraded. Also, for PDCCH interference, interference on PDCCH is not handled. To overcome some of issues listed above, almost blank subframe (ABS) has been proposed. Yet, ABS is mainly designed for two cell case with one aggressor and one victim cell. In a small cell scenario where multiple ag-gressors and victim cells exist, ABS configuration is not easily achievable.

This invention thus proposes to divide one carrier into multiple sub-bands which will be forwarded by the cluster master or the macro cell to small cells within the cluster. Each small cell or a group leader (as a master cell, super cell) in the cluster will choose sub-band or multiple consecutive sub-bands carrier which is advertised as system carrier via PBCH. For example, group 1 chooses f1 sub-band as a system carrier where PSS/SSS will be transmitted in the center 6PRB of f1 subband. Additionally group 1 may choose f2 sub-band as a new carrier which can be scheduled to the advanced UEs with either lower power or reduced RS. A group 2 uses f2 sub-band as a system carrier where PSS/SSS will be transmitted in the center 6PRB of f2 subband. Additionally group 2 may choose f1 sub-band as a new carrier which can be scheduled to the advanced UEs with either lower power or reduced RS. Thus, the group 1 and group 2 control the inter-cell interference coordination in small cell cases.

Whereas, a group 3 uses f1 sub-band as a system carrier where PSS/SSS will be transmitted in the center 6PRB of f1 subband, additionally, f2 sub-band as a new carrier which can be scheduled to the advanced UEs with either lower power or reduced RS considering the group 2. Since the group 3 is located away from the group 1, it may not occur interference problem with group 1 to use f1 sub-band. Also the group 4 uses f3 sub-band as a system carrier where PSS/SSS will be transmitted in the center 6PRB of f3 subband, additionally, f2 sub-band as a new carrier which can be scheduled to the advanced UEs with either lower power or reduced RS considering the group 2, the group 2 is located between the group 1 and group 3.

If FDM is used to mitigate interference level on PSS/SSS signals, the frequency or sub-band selected can be determined based on the cell ID of each group. Furthermore, sub-band selected for carrying PSS/SSS may be used to deliver the information of PSS of the group leader cell. This would be useful particularly when a UE knows the cell IDs to discover without knowing the operating sub-band frequencies. This is particularly useful when each group shares the same PSS sequence which can be omitted as the information is carried in sub-band selection. Then, a UE may discover only SSS to identify a cell. For a legacy UE, however, TDM or other interference mitigation on colliding PSS may be still necessary. If further FDM or TDM method is used within a group to further mitigate interference level on PSS/SSS, the selected frequency or OFDM symbol carrying PSS/SSS can be determined based on cell ID to reduce the UE complexity in cell search. Particularly for the cases where a UE may be able to acquire the list of small cell IDs from the associated macro cell, resource tying with cell ID would be much more useful.

FIG. 7 shows an example of subframe shift among groups in TDD system which the present invention is applied, and FIG. 8 shows an example of candidate TDD configuration and subframe shift 'k' which the present invention is applied.

Alternatively, groups use the same carrier and thus interference on PSS/SSS may not be avoided, subframe shift or OFDM symbol shift among groups can be used to mitigate the interference on cell-specific signals along with or without FFR. Each group may decide 'k' value used for shift in subframe level or OFDM symbol level. Cluster master based on interference graph can determine 'k' value and TDD configuration so that the interference and unusable subframe can be minimized. For example, the candidate 'k' and TDD configuration is shown in FIG. 8.

In this example, group 2 which has the largest number of colliding groups may choose the reference TDD configuration (e.g., TDD conf 2), then to minimize the conflict, shift value k can be selected in subframes which are downlink subframes (e.g., subframe #3/#4). So the values for k would be 3 and 4. As group 1 and group 3 do not interfere each other too much, the same value can be selected for both groups (e.g., k=4). Then, group 4 may choose k=3. Once the shift value is selected, subframe #0/#5 of each cell can be protected by disabling neighboring cell's uplink. For example as shown in the figure, group 1 disables UpPTS in subframe #1/#6 to protect group 2's #0/#5. group 4 will disable UpPTS for group 3/1 and group 2 #0/#5 and disable uplink transmission at #2/#7 which can be used for downlink for advanced UEs which can understand irregular TDD configurations. Other conflicting U/D subframes can be resolved by power control or change the U/D direction further if necessary. For example, group 1 and group 3 has conflicting subframe in 3rd subframe which can be resolved by changing group 4 to configuration 0.

The possible 'k' for each TDD reference configuration is as following table 1.

values of k are {1, 2, 3, 4}, then the selected value k can be chosen using cell ID % 4 where cell ID % 4=1, then k=2.

If subframe shift is used in TDD system, interference between uplink and downlink would occur which can be resolved by reduced uplink power or no uplink scheduling at least in center 6PRB so that PSS/SSS can be protected. Interference due to UL/DL collision in other subframes (where no group is transmitting PSS/SSS) may be handled by other interference measurement mechanisms such as power control or FFR between downlink and uplink. For example, the interference coordination at the first subframe where group 1 transmits SSS and other groups will reduce interference, uplink scheduling may be limited to the frequency where SSS is not transmitted as shown in the example in FIG. 9. When FFR is used, the same RBs which are indicated as 'MAX POWER' RBs may be used for uplink transmission as well when downlink and uplink collide among different groups. For example, in 5th subframe of FIG. 7, UEs in group 2 may be scheduled to use f2 sub-band with full power and f1 with reduced power for uplink as well so that interference due to uplink transmission to UEs receiving data from group 1 can be minimized. As shown in FIG. 7, OFDM symbol can be shifted to protect PSS/SSS. In this case, interference due to UL/DL conflict may occur in OFDM symbol level. If this occurs, either the conflicting OFDM symbol may not be used for data transmission (either uplink or downlink) or power control at OFDM symbol level can be used to mitigate the interference.

Herein, the FDM based DL/UL interference handling is described more details. As shown in FIG. 9, when cells schedule uplink transmission in a subframe which is used for downlink subframe by neighboring groups or cells, it may use the RBs which are signaled as 'LOW POWER' RBs by the downlink cells for uplink transmission. For example, if

TABLE 1

| Uplink-downlink configuration | Downlink-to-Uplink Switch-point periodicity | Subframe number | | | | | | | | | | Available k |
|---|---|---|---|---|---|---|---|---|---|---|---|---|
| | | 0 | 1 | 2 | 3 | 4 | 5 | 6 | 7 | 8 | 9 | |
| 0 | 5 ms | D | S | U | U | U | D | S | U | U | U | 1, 2, 3, 4 |
| 1 | 5 ms | D | S | U | U | D | D | S | U | U | D | 4 |
| 2 | 5 ms | D | S | U | D | D | D | S | U | D | D | 3, 4 |
| 3 | 10 ms | D | S | U | U | U | D | D | D | D | D | 8, 9 |
| 4 | 10 ms | D | S | U | U | D | D | D | D | D | D | 7, 8, 9 |
| 5 | 10 ms | D | S | U | D | D | D | D | D | D | D | 6, 7, 8, 9 |
| 6 | 5 ms | D | S | U | U | U | D | S | U | U | D | 9 |

In general, the group with the largest number of neighboring groups, it can be defined as a reference group, may choose the TDD configuration which has many downlink subframes (e.g., configuration 2) and then neighbor groups may choose the TDD configuration with less downlink subframes (e.g., configuration 1) so that uplink subframe of reference group can e protected. Once it determines TDD configuration and subframe shift value 'k' each group determines which subframe to change the direction or disable UpPTS to protect #0/#5 of each group. The available values of 'k' shown in Table 1 is for minimizing the overlapping DL/UL subframe among groups. It does not prohibit from using other values. Also note that, the value 'k' for subframe shift or OFDM symbol shift can be chosen based on cell ID or group ID or the cell ID of each group leader. For example, if the reference configuration is 0 and then the available group 1 and group 2 indicate that power on RBs in frequency f2/f3 for group 1 and frequency f1/f3 for group 2 will be limited, then group 3 and group 4 may schedule PUSCH in f3 so that FDM between downlink and uplink can be attempted. In addition, RNTP information may be sent to UE where UE may use lower power in RBs indicated as 'MAX POWER' RBs by neighboring groups/cells autonomously. Or, the serving cell may configure additional power for RBs which are indicated as 'MAX POWER' RBs by neighboring groups/cells with lower power than other RBs so that power in colliding frequency/RBs can be reduced. For example, UE in group 4 scheduled in f1 may use lower power to minimize the interference on neighboring UEs' downlink reception.

To enable this feature, separate power and the bitmap of RBs where which power is used can be higher-layer configured to each UE. For example, UE in group 4 may be configured with {[f1, low], [f2, NONE], [f3, regular]} where low and regular refer power control loop for lower uplink power and high uplink power respectively. Power control command via TPC may be applied to both power control equally or applied only to regular power control and the other power control can take 'offset' where power is determined as configured power level for regular power control-offset. Besides, UE may assume that PUCCH will not be transmitted in subframes where uplink subframe collide with other downlink subframes or a separate resource or offset may be configured for those subframes in case PUCCH is allowed to be transmitted in those subframes. Whether PUCCH can be transmitted or not in those conflicting subframes can be configured by higher layer signaling. Alternatively, a bitmap of subframes where PUCCH can be transmitted can be signaled to an UE.

Case1 that PUSCH is scheduled in RBs with regular power is calculated by equation 1.

$$P_{PUSCH,0}(i) = \min \begin{Bmatrix} P_{CMAX,c}(i), \\ 10\log_{10}(M_{PUSCH,0}(i)) + P_{O\_PUSCH,c}(j) + \alpha_c(j) \cdot PL_c + \Delta_{TF,c}(i) + f_c(i) \end{Bmatrix}$$ [Equation 1]

Case 2 that PUSCH is scheduled in RBs with low power is calculated by equation 2.

$$P_{PUSCH,c}(i) = \min \begin{Bmatrix} P_{CMAX,c}(i), \\ 10\log_{10}(M_{PUSCH,0}(i)) + P_{O\_PUSCH,c}(j) + \alpha_c(j) \cdot PL_c + \Delta_{TF,c}(i) + f_c(i) \end{Bmatrix} - \text{offset}$$ [Equation 2]

Alternatively, low power can be calculated using different $\alpha_c(j)$ value and/or $\rho_{CMAX,c}(i)$ and/or initial power setting such as $\rho_{O\_PUSCH,c}(j)$ instead of using offset value. In that case, the power computation can be done per high/regular power PRB and low power PRB separately using different configured parameters.

In other words, separate power control based can be used as below equation 3.

$$P_{PUSCH,c}(i) = \min \begin{Bmatrix} P_{CMAX,c}^{Lower}(i), \\ 10\log_{10}(M_{PUSCH,c}^{Lower}(i)) + P_{O\_PUSCH,c}(j) + \alpha_c^{Lower}(j) \cdot PL_c + \Delta_{TF,c}(i) + f_c^{Lower}(i) \end{Bmatrix}$$ [Equation 3]

DL power adaptation is feasible as well such that EPRE per PRB can be configured separately. For example, for high power PRB and low power PRB independently.

Furthermore, Case 3 that PUSCH is scheduled in RBs mixed with both power, for this, it treats all RBs with low power or, it treats all RBs with normal power. Or, distribute powers can be used for unequally to different RBs. In this case, power is determined by combining both powers in different RBs. Other options do not transmit PUSCH with an assumption of misconfiguration or misscheduling or, use separate precoding for RBs with each power level and then transmit combined uplink signal. If OFDMA is used for uplink transmission, different power per RB can be used.

FIG. 10 shows an example of OFDM symbol shift in TDD system which the present invention is applied.

Referring to FIG. 10, if OFDM symbol shift is used to mitigate the interference issue in PSS/SSS and/or CRS, the generic technique is as follows. Assuming small cells are belonging to a small cell cluster (where time synchronization is assumed within the cluster among cells), small cells are time synchronized each other. It is further assumed that there is a cluster master cell which is a clock reference for all small cells within the cluster. Then, OFDM symbol shift is that the start time of first OFDM symbol of each subframe is shifted to k OFDM symbols to the right compared to the cluster master first symbol starting time. I.e., first_symbol_time_at_cell_i=k OFDM symbol time+first_symbol_time_at_cluster_master. For example, in FIG. 6, if cluster master belongs to group 1, a cell in group 2 starts its first symbol 1 OFDM symbol shifted.

It is further notable to limit the candidate values of 'k' to {0, 1, 2} to avoid collision between SSS and PSS and also avoid too many OFDM symbol overlaps between subframes used for DL in a group and UL in another group. Further, k may be limited to {0, 2} to minimize the collision between CRS and PSS/SSS. Or, combined with subframe shift, 'k' can be generalized to {14m+0, 14m+2} where m>=0. Further, 'k' may be extended to {0, 2, 5, 6, 8, 9} to avoid collision between PSS and SSS and/or between CRS and PSS/SSS. This limitation can be applied to FDD system as well. Combined of subframe shift and OFDM symbol shift can used.

When OFDM symbol shift is used, in OFDM symbol where downlink and uplink collide and UE is configured with lower power in that OFDM symbol, similar to power control addressed in subframe shift, a separate power control for lower power can be configured to the UE. Per each OFDM symbol, if normal power is expected, power level computed by normal power control is used and if lower power is expected, power level computed by lower power control (or offset) is used. Note that OFDM symbols where UL of a cell and DL of another cell (neighboring cells) may collide, UL OFDM symbol may be muted. If new carrier type is used in downlink, DL OFDM symbols can be muted as well.

Another approach to handle UL/DL colliding OFDM symbols with OFDM symbol shift to handle PSS/SSS collision is to use different timing advance values (which is equal to the shifted OFDM symbol duration) per each cell. The TA value can be signaled via SIB so that UE may be able to use the assigned TA value even from PRACH transmission. Legacy UEs may however use the TA=0 as it may not understand pre-allocated TA value.

For example, group 2 may use TA=one OFDM symbol duration and group 3 may use TA=two OFDM symbol durations. If intra-eNB CA is used and at least one CC uses OFDM symbol shift to avoid PSS/SSS collision, either all CCs use the same OFDM symbol shift or handle the overlapped OFDM symbols if different shift values are used among CCs. For example, if two CCs are aggregated (CC1 and CC2) with OFDM symbol shift value k1=0 and k2=2 respectively (i.e., CC1 no shift, CC2 2 OFDM symbol shift), UpPTS between two CCs may not overlap where power assuming single CC can be used or if two uplink signals are overlapped, power scaling can be extended to the multiple OFDM symbols over overlapped portion.

Another OFDM symbol shift mechanism is to use shifting among cells with the same PSS sequence only. For example, cell1 and cell2 belongs to the same PSS sequence, based on SSS, OFDM symbol shift can be further used such that k=floor (cell ID/3) % m (e.g., m=2) where m=0 means no shift and m=1 means two OFDM symbol shift. By this way, colliding PSS sequences among cells can be further reduced.

This embodiment further notes that actual synchronization signals can be shifted with subframe offset or symbol offset instead of subframe boundary shift (in OFDM symbol shift or subframe shift). In this case, the values can be used are limited with the constraint to avoid collision with non-colliding DM-RS and/or CSI-RS. The value k can be used to shift PSS/SSS instead of moving subframe boundary. This is particularly useful in non-backward compatible carrier where new location and/or sequence for synchronization signals can be considered.

Once first-tier interference coordination is achieved at inter-group level within a small cell cluster, intra-group interference coordination can be further achieved either by applying FFR or TDM (with ABS configuration) or power control. FIG. 11 shows an example of TDM ICIC within a group by using ABS configuration in group 2.

FIG. 11 shows an example of TDM within a group which the present invention is applied.

Referring to FIG. 11, a subframe shift or OFDM symbol shift can be used within a group rather than among groups. Also, it can be applied to a flat structure where grouping among cells would not be attempted. Also, within a group CoMP techniques or interference cancellation or interference suppression can be coordinated where data exchange among cells within a group may be done via air interface for fast exchange if needed rather than depending on X2 interface.

To protect at least subframes where PSS/SSS is transmitted, each cell or group (group leader or a representative cell) can exchange the following information. Firstly, subframe offset compared to the cluster master subframe number—e.g., in FIG. 9, if group 1 contains the cluster master, group 2 cells uses '1' as subframe offset. Secondly, the list of downlink subframes to be protected, for this, a bitmap can be used or the subframe numbers and the period can be used. Additionally, duration of protection can be configured. For example, if group 2 cells want to protect subframe 0 in every 40 msec, then it may request to protect subframe 0 with 40 msec periodicity. If group 2 cells want to protect subframe 0 and 5 during 200 msec starting a certain radio frame or time, it may request to protect subframe 0/5 with 10 msec periodicity with start and end radio frame or time.

Another approach to handle high interference in synchronization signal or discovery signal is to use muting or reduced power by neighboring cells to protect a set of subframes carrying synchronization or discovery signals. For example, each cell may protect one radio frame every 10 radio frames, the radio frame may be selected by k=cell ID % 10 and SFN % 10=k. In other SFN, the cell may transmit the synchronization signal with reduced power instead of full power to protect other cell's synchronization signals.

More specifically, muting can be only applied to primary synchronization signals instead of applying to all primary and secondary synchronization signals. Furthermore, instead of muting on those subframes or OFDM symbols carrying discovery or synchronization signals, other neighboring cells may use reduced power on those subframes or OFDM symbols. If synchronization or discovery signals are not transmitted in the same OFDM symbol and/or same subframe, muting and/or reduced power approach can be applied to PDSCH and/or control channel (such as EPDCCH) transmission as well.

Another approach to handle interference or collision issue between synchronization signals from multiple neighbor cells is to use 'smaller number of sub-carriers' for synchronization signals. For instance, the synchronization signals can be transmitted in lower number of subcarriers than currently specified 72 subcarriers (such as 36 sub-carriers or 18 subcarriers). For example, if 36 subcarriers is used, cell ID %2=0 can transmit its PSS/SSS at the higher subcarriers within 72 subcarriers where legacy PSS/SSS is transmitted and cell ID %2=1 can transmit its PSS/SSS at the lower sub-carriers. Similar mechanism can be applied to the case with subcarriers=18. More specifically, this can be applicable only to PSS as SSS may require the whole 62 sub-carriers for the transmission. More specifically, the muting pattern may be informed to UEs if it does not follow predetermined rule which can be inferred from cell ID (e.g., which radio frame with good power for a certain cell ID). Note that cell ID referred in this invention is not limited to physical cell ID used in LTE specification which has the range of 0-503. It is rather an ID which a UE can identify a cell or a transmission point. The range can be wider such as 0 to 1023. Another example is to use 'IP-address-like' addressing which indeed has a very wide range.

When the number of subcarriers used for PSS and/or SSS is reduced, multiple multiplexing among neighbor PSS/SSS signals can be considered as follows. One of sub-band based approach is considered that within center 6PRB or other PRBs assigned to be used for synchronization signals, sub-band can be defined where one sub-band is used for one PSS and/or SSS as following table 2. The other of comb-like approach: for example, if the number of subcarriers used for PSS and/or SSS, there are four PSS and/or SSS transmitted in 6PRB. Thus, 72 carriers are grouped into 18 groups where four subcarriers in each group is used for each PSS and/or SSS respectively as following table 3.

TABLE 2

| |
|---|
| 18 carriers → PSS1 |
| 18 carriers → PSS2 |
| 18 carriers → PSS3 |
| 18 carriers → PSS4 |

TABLE 3

| |
|---|
| 1 carriers → PSS1 |
| 1 carriers → PSS2 |
| 1 carriers → PSS3 |
| 1 carriers → PSS4 |
| 1 carriers → PSS1 |
| 1 carriers → PSS2 |
| . . . |
| 1 carriers → PSS4 |

This embodiment notes that this can be applicable to other discovery signals based on either a new discovery signal or existing RS such as PRS, CRS, CSI-RS, and PSS/SSS.

Also, it connects with eIMTA with dynamic TDD configuration as an example. The TDD UL/DL configuration for traffic adaptation is used by reconfiguration or HARQ scheme. Also interference mitigation with TDD UL/DL reconfiguration is used with UL power control.

TDM ICIC with different power level can be considered. Similar to FFR, ICIC based on TDM can be reused among small cells. For example, TDM can be constructed based on HARQ process assuming the numbering is done starting the first uplink subframe in each radio frame (e.g., in TDD configuration 1 as shown in FIG. 12.

FIG. 12 shows an example of TDD configuration 1 TDM example which the present invention is applied.

Cells may use different TDM set for uplink transmission as shown in the figure. In this example, instead of disabling other subframes not used for the assigned HARQ processes (e.g., subframe #0/1/3/4/5/6/8/9 for TDM set1), low power can be used similar to reduced power ABS. Overall, eNB can exchange the set of subframes where it is intending to reduce its maximum power to a certain level. For example, a cell planning to use TDM set1 and set2 may broadcast a bitmap of 10 msec with [L,L,H,H,L,L,H,L,L,H] where each bit maps to each subframe in radio frame. This bitmap can be used with different size depending on HARQ process and TDD configuration (e.g., TDD conf0 may use 40 msec bitmap). Or, bitmap can be used with the maximum uplink HARQ process numbers (e.g., 4 in TDD configuration 1) where each bit maps to each HARQ process where [L,H,L,H] implies subframes used for HARQ process #0 and #2 will be used with lower maximum power. In this case, two power control should be given to a UE to calculate power values for subframes with lower maximum and maximum power respectively.

In terms of TPC to increase or decrease the power level of each power control can be limited to subframes where uplink grant can be transmitted. For example, with [L,H,L,H] configuration with TDD configuration1, uplink grant or TPC command transmitted in subframe #9 or #1 can be used for controlling uplink power with lower maximum power used in uplink subframe #2 or #7. If uplink HARQ is used for controlling the power, this can be applied to PUSCH power control. For PUCCH, downlink HARQ process can be used where a set of subframes can be configured with lower maximum power and TPC for PUCCH transmitted in a subframe with lower maximum power configuration can be used to control PUCCH power which will be transmitted with lower maximum power compared to UE maximum power.

For example, with TDD configuration1, if 10 bits bitmap for a radio frame is configured with [L, H, X, X, H, L, L, X, X, H], the power control used for PUCCH scheduled in subframe #8 can be adapted by TCP in subframe #0/#1/#4. As some downlink subframes allocated to the same uplink subframe may be assigned with different power level, at least one downlink is assigned with low power, a UE may assume the PUCCH is transmitted with lower maximum power control loop.

Alternatively, a lower maximum power uplink subframe can be configured where PUCCH is transmitted with lower maximum power in those configured subframes. In terms of TPC to adapt a lower limit PUCCH power, associated downlink (e.g., subframe #0/#1/#4 for uplink #8) TPC can be used. The main motivation of limiting uplink power at certain subframes is to minimize the potential interference on neighboring eNBs and downlink transmission. Alternatively, a UE may not be aware of reduced uplink power subframe. Rather, dynamic signaling can be used to reduce the uplink power by power scaling.

For example, power scaling 1 or 0.5 can be dynamically signaled via DCI with a new field or reuse existing field. When a UE receives uplink grant with power scaling 0.5, it would scale down uplink power to 50% (or other predetermined value which can be higher layer configured, in other words, power scaling on/off can be signaled and the scaling ratio can be higher layer signaled separately). Another alternative solution is to use two different PCmax for full power and reduced power uplink subframes where power control loop is one. In reduced power uplink subframe, a UE shall use the lower PCmax so that the power can be limited below to a certain threshold. If uplink TA is used for handling overlapped UL and DL OFDM symbols either for symbol shift, TA value shall be increased. This embodiment notes that this technique can be applicable to the cases where synchronization among neighboring TDD cells are not aligned due to network synchronization mechanism or different operators or depending on the situation. Furthermore, the power (lower power) may be applied only to PUSCH or PUCCH data only where power on DM-RS is kept the same as full power. Alternatively, DM-RS power boosting can be used along with lower power configuration where additional power boosting can be used for DM-RS with the same power configuration to the PUSCH or PUCCH. The similar mechanism can be applied to downlink HARQ process as well.

This technique can be applied to both TDD and FDD. When it is applied to FDD, lower power uplink subframes can be configured where a UE will use two different power control loops. TPC to adapt each power control loop will be limited to downlink subframes which will transmit uplink grant (i.e., if uplink #5 subframe is configured with lower maximum power, TPC transmitted in the uplink grant subframe (#1) will be used to control uplink power in #5).

To support this, the information exchange between small cells includes load indication, High Interference indication per subframe or per HARQ process, Relative Lower Tx Power Subframe (RLTPS) and Radio resource status. The load indication includes that UL interference overload indication per subframe instead of per PRB, load information per each uplink HARQ process or per subframe can be indicated. The High Interference indication includes that interference per subframe or per HARQ process instead of per PRB, high interference observation can be reported per uplink HARQ process or per uplink subframe with the same size of ABS configuration bitmap. The RLTPS is determined with a set of subframes used with RLTPS threshold uplink and/or downlink. This can be configured per uplink HARQ process as well. Radio resource status includes the usage of subframe in downlink and uplink as same as ABS bitmap size. This embodiment notes that the TDD configuration each cell is using can be signaled along with above messages and/or ABS configuration.

This technique would be useful to allow different TDD configurations among multiple cells. For example, an eNB transmit its TDD configuration with a set of HARQ processes that will be used with maximum power or lower power, then neighbor eNB may choose different TDD configuration which will could avoid or minimize the collision with other eNB's protected subframes. Furthermore, subframe shift can be used along with protected subframe configuration. For example, if there is no HARQ process which can be assigned as protected HARQ process due to the conflict with a neighbor cell, it may shift subframe to find a candidate HARQ process.

Hereinafter, a subframe set configuration applying UL HII is described more details, a different HII can be configured per a set of subframes where one or more set of subframes can be configured with HII. If this is supported, HII can be changed as follows. This may be used for protecting PUCCH or protected PUSCH HARQ process. UL High Interference Indication and Subset Configuration follows with table 4, this IE (information element) provides, per PRB, a 2 level report on interference sensitivity. The interaction between the indication of UL Overload and UL High Interference is implementation specific.

TABLE 4

| IE/Group Name | Presence | Range | IE type and reference | Semantics description |
|---|---|---|---|---|
| HII | M | | BIT STRING (1 ... 110, ...) | Each position in the bitmap represents a PRB (first bit = PRB 0 and so on), for which value "1" indicates 'high interference sensitivity' and value "0" indicates 'low interference sensitivity'. The maximum number of Physical Resource Blocks is 110 |
| A subframe set | M | | BIT STRING (SIZE(40 or TBD)) | Each position in the bitmap represents a subframe, for which value "1" indicates 'HII is applicable and value "0" indicates 'HII is not applicable'. The first position of the ABS pattern corresponds to subframe 0 in a radio frame where SFN = 0. The ABS pattern is continuously repeated in all radio frames. The maximum number of subframes is 40 or TBD (e.g., 70 in TDD) |

Similar thing can be applied to RNTP as well as follows table 5, this IE provides an indication on DL power restriction per PRB in a cell and other information needed by a neighbour eNB for interference aware scheduling.

TABLE 5

| IE/Group Name | Presence | Range | IE type and reference | Semantics description |
|---|---|---|---|---|
| RNTP Per PRB | M | | BIT STRING (6 ... 110, ...) | Each position in the bitmap represents a $n_{PRB}$ value (i.e. first bit = PRB 0 and so on), for which the bit value represents RNTP ($n_{PRB}$), defined in TS 36.213 [11]. Value 0 indicates "Tx not exceeding RNTP threshold". Value 1 indicates "no promise on the Tx power is given" |
| RNTP Threshold | M | | ENUMERATED (−∞, −11, −10, −9, −8, −7, −6, −5, −4, −3, −2, −1, 0, 1, 2, 3, ...) | $RNTP_{threshold}$ is defined in TS 36.213 [11] |
| Number Of Cell-specific Antenna Ports | M | | ENUMERATED (1, 2, 4, ...) | P (number of antenna ports for cell-specific reference signals) defined in TS 36.211 [10] |
| P_B | M | | INTEGER (0 ... 3, ...) | $P_B$ is defined in TS 36.213 [11] |
| PDCCH Interference Impact | M | | INTEGER (0 ... 4, ...) | Measured by Predicted Number Of Occupied PDCCH OFDM Symbols (see TS 36.211 [10]). Value 0 means "no prediction is available" |
| A subframe set | M | | BIT STRING (SIZE(40 or TBD)) | Each position in the bitmap represents a subframe, for which value "1" indicates 'HII is applicable and value "0" indicates 'HII is not applicable'. The first position of the ABS pattern corresponds to subframe 0 in a radio frame where SFN = 0. The ABS pattern is continuously repeated in all radio frames. The maximum number of subframes is 40 or TBD (e.g., 70 in TDD) |

Furthermore, this embodiment discloses other ICIC techniques, when a number of small cells is smaller than or comparable to the number of UEs served by small cells within a cluster, RNTP-like FDM can be done per UE-basis rather than eNB-basis. In this case, each serving cell decides the intended uplink RBs for each UE (based on interference measurement, measurement on UE signals, CSI feedbacks) which will be exchanged via backhaul among small cells. Each small cell may limit the downlink power for RBs which are assigned to UEs which are victim UEs of the cell when uplink for the UE's serving cell and downlink of the cell collide. For uplink transmission, those RBs can be chosen for other UE's uplink transmission with lower priority or with lower power. This is similar to HII except that HII will override RNTP. It is disclosed by FIG. 13.

Lastly, RRM measurement enhancement is described. When subframe shift is used in TDD system or different TDD configuration is used among different cells or groups, interference on each UE would vary per subframe. For example, in FIG. 13, UE1 attached to cell4/group 2 would experience different interference per subframe depending on UL/DL configuration of neighboring cells and neighboring UEs. This invention thus proposes to configure to each UE to measure RSSI or other interference measurement per subframe in each radio frame which will be averaged over multiple radio frames and report to the serving cell either periodically or aperiodically (i.e., upon the request).

The information can be used for eNB to schedule or avoid a certain set of downlink subframes for the target UE. For example, in FIG. 8, the cell4 may not schedule downlink data to UE1 in second and seventh subframe where interference level is high. Per-subframe basis RRM (either both RSRQ and RSRP or only RSSI or RSRQ) can be configurable to a UE. eNB may trigger per-subframe basis RRM if high interfering neighbor UEs are suspected (e.g., UE2 in FIG. 3 for UE1). This can be useful for different TDD configurations used among cells or clusters or groups to infer inter-ferences from close-by neighboring UEs.

This embodiment notes that the number of subframes which will be measured and reported separately in one measurement period (e.g., 10 subframes or 5 subframes) is configurable.

FIG. 14 is a block diagram showing a wireless communication system according to an embodiment of the present invention.

A BS 1450 includes a processor 1451, a memory 1452, and a radio frequency (RF) unit 1453. The memory 1452 is coupled to the processor 1451, and stores a variety of information for driving the processor 1451. The RF unit 1453 is coupled to the processor 1451, and transmits and/or receives a radio signal. The processor 1451 implements the proposed functions, procedures, and/or methods. In the embodiments of FIG. 2 to FIG. 13, the operation of the BS can be implemented by the processor 1451.

Especially, the processor 1451 may configure one or more cells with different frequencies, for this invention the processor 1451 configures the cells to support Semi-Persistent Scheduling, TTI-bundling, HARQ-ACK procedures. The processor 1451 may configure and transmit a configuration including a small cell as a relay node, the information related to the relay node (e.g., cell ID, scheduling information, etc) to the UE so that the UE can properly receive the data from the relay node. It also includes ACK/NACK subframe configuration for the data transmission.

Also the processor 1451 may configure an ePDCCH configuration, CSI/RRM measurement for the small cell because the physical transmission point for data transmission is changed for the UE, and configure and transmit discovery signals or PSS/SSS scrambled with the small cell ID. And then processor 1451 may perform a RACH procedure and data transmission via the selected cell by using a corresponding cell ID. And the processor 1451 may also configure CRS patterns by the small cell ID or PSS/SSS each, the CRS patterns includes a start subframe, subframe set, and RB of the CRS in a radio frame. In other words, the processor 1451 may configure and transmit the configuration using a serving cell (Scell) configuration including multiple small cells, a hand-over configuration, a dual connectivity configuration, a relay node configuration, or a radio resource control (RRC) configuration via a primary cell (Pcell or master cell) of macro cell. The processor 1451 may configure proper TDD configuration for the macro cell and small cells.

Furthermore, the processor 1451 may configure sets of grouping of the neighboring cells (small cell group) to be applied with a different sub-band, a subframe shift, or a OFDM symbol shift according to send PSS/SSS, cell RS as a synchronization, or/and a discovery signal. That is, the processor 1451 may make and transmit the sets of grouping to UEs in a corresponding cell by considering Interference on Cell Specific RS and Interference on Synchronization signals. The information of grouping includes resource mapping information including a sub-band and a subframe in which a synchronization signal and a reference signal are transmitted according to a corresponding group, the sub-band and the subframe are changed by the corresponding group. Wherein the grouping is determined by at least one of a list of the UEs in which cells each serves, a backhaul quality between cells, discovery signal strength, a frequency carrier, a discovery signal via air interface, a cell identification (ID), a cell coverage, a Time Division Duplex (TDD) configuration.

Also, the processor 1451 may configure a reference TDD reference configuration to minimize conflicts between cells, a shift value to be selected in subframes which the subframes are changed by the grouping, via a serving cell, a power of uplink transmission at predetermined subframes to up or down.

The wireless device 1460 includes a processor 1461, a memory 1462, and an RF unit 1463. The memory 1462 is coupled to the processor 1461, and stores a variety of information for driving the processor 1461. The RF unit 1463 is coupled to the processor 1461, and transmits and/or receives a radio signal. The processor 1461 implements the proposed functions, procedures, and/or methods. In the embodiments of the FIG. 2 to FIG. 13, the operation of the UE can be implemented by the processor 1461.

Especially, the processor 146 may configure one or more cells with different frequencies, for this invention the processor 146 configures the cells to support Semi-Persistent Scheduling, TTI-bundling, HARQ-ACK procedures. The processor 1461 may configure and receive a configuration of serving cells including a macro cell and a small cell as a relay node, the information related to the relay node (e.g., cell ID, scheduling information, etc) supports that the UE can properly receive the data from the relay node of the small cell and the macro cell. It also includes ACK/NACK subframe configuration for the data transmission. The processor 1461 may also calculate ACK/NACK timing after receiving the data based on the ACK/NACK subframe configuration.

Also the processor 1461 may configure an ePDCCH configuration, CSI/RRM measurement for the small cell because the physical transmission point for data transmission is changed for the UE, and configure and receive discovery signals or PSS/SSS scrambled with the small cell ID. And then processor 1461 may perform a RACH procedure and data transmission via the selected cell by using a corresponding cell ID. And the processor 1461 may also configure CRS patterns by the small cell ID or PSS/SSS each, the CRS patterns includes a start subframe, subframe set, and RB of the CRS in a radio frame. The processor 1461 may configure proper TDD configuration for the macro cell and small cells.

Furthermore, the processor 1461 may configure sets of grouping of the neighboring cells (small cell group) to be applied with a different sub-band, a subframe shift, or a OFDM symbol shift according to send PSS/SSS, cell RS as a synchronization, or/and a discovery signal. That is, the processor 1461 may make and transmit the sets of grouping to UEs in a corresponding cell by considering Interference on Cell Specific RS and Interference on Synchronization signals. The information of grouping includes resource mapping information including a sub-band and a subframe in which a synchronization signal and a reference signal are transmitted according to a corresponding group, the sub-band and the subframe are changed by the corresponding group. Wherein the grouping is determined by at least one of a list of the UEs in which cells each serves, a backhaul quality between cells, discovery signal strength, a frequency carrier, a discovery signal via air interface, a cell identification (ID), a cell coverage, a Time Division Duplex (TDD) configuration.

Also, the processor 1461 may configure a reference TDD reference configuration to minimize conflicts between cells, a shift value to be selected in subframes which the subframes are changed by the grouping, via a serving cell, a power of uplink transmission at predetermined subframes to up or down. So the processor 1461 may acquire different TDD configurations by using the reference TDD reference configuration and the shift value for the each cell of the neighboring cells and/or control a power of uplink transmission at predetermined subframes by using the information of grouping to minimize conflicts between the cells. Or, the processor 1461 may check to receive different TDD configurations of the neighboring cells, the TDD configuration each includes at least one of a setsof HARQ processes to use with a maximum power or a lower power, a subframe configuration as a candidate HARQ process, and a subframe set configuration to indicate a high interference indication per subframe or per a HARQ process. Further, the processor 1461 may check to receive a measurement configurations having a subframe shift of a different TDD configuration according to the information of grouping, the measurement includes that at least one of a Reference Signal Received Power (RSRP), a Reference Signal Received Quality (RSRQ), or a Received Signal Strength Indicator (RSSI) in a set of subframes.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method for performing interference coordination in a wireless communication system, by a user equipment (UE), the method comprising:
   transmitting, by the UE, measurement results on neighboring cells, to a serving cell,
   wherein the measurement results on the neighboring cells are shared with each of the neighboring cells, and
   wherein the number of overlapped UEs between the serving cell and each of the neighboring cells is calculated, based on the shared measurement results on the neighboring cells;
   receiving, by the UE, information on cell grouping of the neighboring cells,
   wherein the cell grouping is performed between the serving cell and a neighboring cell, based on the number of overlapped UEs between the serving cell and the neighboring cell;
   receiving a time division duplex (TDD) reference configuration to minimize conflicts between cell groups and a shift value to be selected in subframes which are changed by the cell grouping, from the serving cell;
   acquiring different TDD configurations by using the TDD reference configuration and the shift value for the cell groups; and
   receiving a signal to be applied with at least one of a certain sub-band, a subframe shift, or an orthogonal frequency division multiplexing (OFDM) symbol shift according to a cell group which is defined by the cell grouping.

2. The method of claim 1, wherein the information on the cell grouping includes resource mapping information including a sub-band and a subframe in which a synchronization signal and a reference signal are transmitted according to the cell group, and the sub-band and the subframe are changed by the cell group.

3. The method of claim 2, wherein the cell grouping is determined by at least one of a backhaul quality between cells, a discovery signal strength, a frequency carrier, a discovery signal via air interface, a cell identification (ID), a cell coverage, a TDD configuration, or a frequency division duplex (FDD) configuration.

4. The method of claim 2, wherein the information includes a list of cell identifications (IDs) having a cell-specific reference signal (CRS) port or a multicast-broadcast single-frequency network (MBSFN) configuration which is configured to the UE.

5. The method of claim 1, further comprising:
   controlling a power of an uplink transmission at predetermined subframes by using the information on the cell grouping to minimise conflicts between the cell groups.

6. The method of claim 1, further comprising:
exchanging the information between small cells of the neighboring cells,
wherein the information includes at least one of a load indication to indicate an uplink interference overload indication per subframe, a high interference indication per subframe or per a hybrid automatic repeat request (HARQ) process, information of a relative lower transmission power subframe (RLTPS), and a radio resource status.

7. The method of claim 1, further comprising:
receiving different TDD configurations of the neighboring cells,
wherein each TDD configuration each includes at least one of a set of hybrid automatic repeat request (HARQ) processes to use with a maximum power or a lower power, a subframe configuration as a candidate HARQ process, or a subframe set configuration to indicate a high interference indication per subframe or per a HARQ process.

8. The method of claim 1, further comprising;
receiving measurement configurations according to the information on the cell grouping,
wherein a measurement based on the measurement configurations includes at least one of a Reference Signal Received Power (RSRP), a Reference Signal Received Quality (RSRQ), or a Received Signal Strength Indicator (RSSI).

9. A wireless device for performing interference coordination in a wireless communication system, the wireless device comprising:
a transceiver configured to transmit and receive a radio signal; and
a processor operatively coupled to the transceiver,
wherein the processor is configured to:
control the transceiver to transmit measurement results on neighboring cells, to a serving cell,
wherein the measurement results on the neighboring cells are shared with each of the neighboring cells, and
wherein the number of overlapped UEs between the serving cell and each of the neighboring cells is calculated, based on the shared measurement results on the neighboring cells,
control the transceiver to receive information on cell grouping of the neighboring cells,
wherein the cell grouping is performed between the serving cell and a neighboring cell, based on the number of overlapped UEs between the serving cell and the neighboring cell,
control the transceiver to receive a time division duplex (TDD) reference configuration to minimize conflicts between cell groups and a shift value to be selected in subframes which are changed by the cell grouping, from the serving cell,
acquiring different TDD configurations by using the TDD reference configuration and the shift value for the cell groups, and
control the transceiver to receive a signal to be applied with at least one of a certain sub-band, a subframe shift, or an orthogonal frequency division multiplexing (OFDM) symbol shift according to a cell group which is defined by the cell grouping.

10. The wireless device of claim 9, wherein the processor is further configured to:
control a power of an uplink transmission at predetermined subframes by using the information on the cell grouping to minimize conflicts between the cell groups.

11. The wireless device of claim 9, wherein the processor is further configured to receive different TDD configurations of the neighboring cells, and
wherein each TDD configuration includes at least one of a set of hybrid automatic repeat request (HARQ) processes to use with a maximum power or a lower power, a subframe configuration as a candidate HARQ process, or a subframe set configuration to indicate a high interference indication per subframe or per a HARQ process.

12. The wireless device of claim 9, wherein the processor is further configured to receive measurement configurations according to the information on the cell grouping, and
wherein a measurement based on the measurement configurations includes at least one of a Reference Signal Received Power (RSRP), a Reference Signal Received Quality (RSRQ), or a Received Signal Strength Indicator (RSSI).

13. The wireless device of claim 9, wherein the information on the cell grouping includes resource mapping information including a sub-band and a subframe in which a synchronization signal and a reference signal are transmitted according to the cell group, and the sub-band and the subframe are changed by the cell group, and
wherein the cell grouping is determined by at least one of a backhaul quality between cells, a discovery signal strength, a frequency carrier, a discovery signal via air interface, a cell identification (ID), a cell coverage, a TDD configuration, or a frequency division duplex (FDD) configuration.

14. The wireless device of claim 9, wherein the processor is further configured to exchange the information between small cells of the neighboring cells, and
wherein the information includes at least one of a load indication to indicate an uplink interference overload indication per subframe, a high interference indication per subframe or per a hybrid automatic repeat request (HARQ) process, information of a relative lower transmission power subframe (RLTPS), and a radio resource status.

* * * * *